US007097876B2

(12) United States Patent
Tojo et al.

(10) Patent No.: US 7,097,876 B2
(45) **Date of Patent: *Aug. 29, 2006**

(54) METHOD FOR FORMING PROTECTIVE FILM OF STRIPPABLE PAINT ON SPRAYED COATING OF AUTOMOBILE OR OTHER LARGE-SIZED PRODUCT

(75) Inventors: Hideaki Tojo, Saitama-ken (JP); Hideo Ishida, Saitama-ken (JP); Hisashi Kurota, Saitama-ken (JP); Hideo Hiroe, Saitama-ken (JP); Takao Arasawa, Saitama-ken (JP); Satoru Yamada, Saitama-ken (JP); Nobuyuki Okita, Saitama-ken (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 251 days.

(21) Appl. No.: 08/398,881

(22) Filed: Mar. 6, 1995

(65) Prior Publication Data

US 2003/0087028 A1 May 8, 2003

(51) Int. Cl.

| | |
|---|---|
| ***B05D 1/32*** | (2006.01) |
| ***B05D 3/06*** | (2006.01) |
| ***B05D 5/20*** | (2006.01) |
| ***B05D 7/16*** | (2006.01) |
| ***C09D 3/02*** | (2006.01) |

(52) U.S. Cl. .................. 427/156; 427/388.1; 427/282; 427/409

(58) Field of Classification Search ................ 427/156, 427/388.1, 282, 409; 29/897.2; 180/89.1, 180/311; 280/29; 296/185, 187

See application file for complete search history.

(56) References Cited

U.S. PATENT DOCUMENTS 3,544,349 A * 12/1970 Isaksen et al. ............. 427/156
3,979,535 A * 9/1976 Govindan .................. 427/377

(Continued)

FOREIGN PATENT DOCUMENTS

JP 50-67845 A 6/1975

(Continued)

*Primary Examiner*—Timothy Meeks
*Assistant Examiner*—William Phillip Fletcher, III
(74) *Attorney, Agent, or Firm*—Carrier, Blackman & Associates, P.C.; Joseph P. Carrier; William D. Blackman

(57) ABSTRACT

There are disclosed a method and a apparatus for applying a strippable paint to a large-sized product finished with a sprayed coating, such as an automobile, to form a protective film on the surface of the coating. The product is conventionally kept in stock for a period of time before it is shipped. Contaminations such as dust are washed away from the surface of the product. Then, the strippable paint is applied, preliminarily dried, and non-preliminarily dried to form the protective film out of the strippable paint on the surface of the coating. This protective film is formed easily, appropriately, and reliably. The obtained protective film has a uniform and sufficient thickness. Even if the surface contains unapplied regions to which the paint should not be applied, the paint can be applied to the whole surface of the coating while avoiding the unapplied regions according to the invention. The application can be performed easily and reliably without leaving unapplied portions around the unapplied regions.

33 Claims, 6 Drawing Sheets

U.S. PATENT DOCUMENTS

| | | | | | |
|---|---|---|---|---|---|
| 4,367,787 | A | * | 1/1983 | Bradshaw | 118/326 |
| 4,382,174 | A | * | 5/1983 | Barns | 338/237 |
| 4,727,232 | A | * | 2/1988 | Omori et al. | 219/91.2 |
| 4,907,533 | A | * | 3/1990 | Nelson et al. | 118/663 |
| 5,143,949 | A | * | 9/1992 | Grogan et al. | 523/334 |
| 5,186,978 | A | * | 2/1993 | Woodhall et al. | 427/154 |
| 5,281,436 | A | * | 1/1994 | Swidler | 427/154 |
| 5,328,725 | A | * | 7/1994 | Sato et al. | 427/156 |
| 5,411,760 | A | * | 5/1995 | Woodhall et al. | 427/156 |
| 5,428,095 | A | * | 6/1995 | Swidler | 427/156 |

FOREIGN PATENT DOCUMENTS

| | | | |
|---|---|---|---|
| JP | 61212363 | A | 9/1986 |
| JP | 62095178 | A | 5/1987 |
| JP | 03259966 | A | 11/1991 |
| JP | 3267171 | | 11/1991 |
| JP | 04310271 | A | 11/1992 |
| JP | 04313366 | A | 11/1992 |
| JP | 5-22280 | | 3/1993 |
| JP | 05065437 | A | 3/1993 |

* cited by examiner

METHOD FOR FORMING PROTECTIVE FILM OF STRIPPABLE PAINT ON SPRAYED COATING OF AUTOMOBILE OR OTHER LARGE-SIZED PRODUCT

BACKGROUND OF THE INVENTION

1. Field of the Invention

The present invention relates to a method of spraying a strippable liquid paint on the surface of a large-sized product finished with a sprayed coating, such as an automobile, to form a protective film. Also, the invention relates to a machine for implementing this method and to a method of forming this protective film in such a way that those portions of the product which need no protective film are not sprayed with the paint.

2. Description of the Related Art

Typically after an automobile is assembled, it is initially kept in stock before it shipped. Therefore, a long interval passes until the vehicle is shipped. For this reason, dust or the like adheres to the surface of the sprayed coating on the outside of the automobile. In order to prevent this adhesion of dust, it has been attempted to form a protective film on the surface of the sprayed coating of the automobile. In the past, this formation of the protective film has been carried out by applying a liquid, rust preventive wax to the automobile's surface, which would be removed when the automobile reached its shipping destination.

In recent years, techniques for alleviating the burden imposed by a wax-removing operation performed at the destination or for environmental protection has been disclosed, for example in Japanese Patent Laid-Open No. 267171/1991. In particular, a plastic film having a removable pressure-sensitive adhesive is pressed against the surface of an assembled automobile finished with a sprayed coating, using a vacuum. Thus, the body surface is coated with this plastic film. In this way, the coating surface of the finished automobile is temporarily protected.

With respect to small parts, a strippable paint has been sprayed on them to form a protective film.

In the above-described known method consisting of coating the body surface with a plastic film, the whole surface of the automobile is covered with the protective film. Therefore, the protective film is stuck even on those portions which are not required to be protected such as the windshield. This leads to a cost increase.

Where a strippable paint is employed, it is possible to protect only desired portions. However, if the sprayed object is large such as an automobile, the protective film lacks uniformity because of nonuniform drying, the film is damaged by matter adhering to the surface of the coating, or other problems take place.

Where a strippable paint is applied to the surface of the coating of a finished automobile in an attempt to form a protective film for the coating, dust or the like often adheres to the surface of the coating. Also, dirty water may adhere to the surface. Furthermore, it may be wetted with rainwater or the like. In these situations, appropriate and smooth formation of the protective film is hindered when a strippable paint is applied. Moreover, the temperature of the surface of the coating drops. This makes it difficult to form a protective film on the surface of the coating.

Where a strippable paint is applied, the fringes of a region to be applied with the paint are applied with the paint, using a brush or a roller. Then, the paint is sprayed against the inner applied region surrounded by the fringes. In this way, a masking operation is dispensed with.

However, in some cases, components which are not required to be sprayed with paint such as windshield washer nozzles are located around the center of the region to which a strippable paint is applied. The washer nozzles are holes for ejecting cleaning liquid toward the windshield. In these cases, if the paint is sprayed against the hood after the paint has been applied to the fringes of the washer nozzles with a brush or nozzle, it is considerably difficult to perform the spraying operation in such a way that the paint does not adhere to the washer nozzles. Moreover, the strippable paint may be directly applied to the entrances to the windshield washer nozzles or enter the nozzles. Furthermore, dust of the paint may enter the nozzles. As a result, a film of the paint is formed at the entrances to the nozzles or even inside the nozzles. Hence, extra steps must be carried out to remove the film.

Where the roof of an automotive body may be opened such as a sliding roof, a conceivable paint application method consists of first applying the paint to the vicinities of the opening in the roof and to the vicinities of the engaging portion of the roof with a brush or roller and then spraying the paint against the remaining desired portions. However, a sealing member made of rubber is mounted around the opening in the roof and acts as a seal when the sliding roof is in a closed state. Therefore, there is the possibility that dust of the strippable paint enters the gap between the rubber seal and the sliding roof.

Side turning lights which are mounted to right and left fenders, respectively, on an automotive body via rubber seals have similar drawbacks. Therefore, a procedure for removing the protective film of a strippable paint is inevitable once the automobile reaches the destination. This procedure involves numerous steps.

SUMMARY OF THE INVENTION

The present invention has been made to solve these various problems of the related art.

A first embodiment of the present invention resides in a method of forming a protective film on the surface of a large-sized product finished with a sprayed coating, such as an automotive body, by applying a strippable paint to the product. Before the strippable paint is applied to the product, contaminations on the coating surface such as dust and dirt due to rainwater are removed as a pretreatment step. This pretreatment step consists of a washing step using warm water and a dehydrating step using blown hot air.

In this pretreatment step, contamination, such as dust, dirty water, and rainwater, adhering to the surface of the sprayed coating on an automotive body on which a protective film is to be formed are removed. This assures that a strippable paint will be smoothly and effectively applied to the coating surface on the automotive body.

In a second embodiment of the invention, the step of applying a strippable paint to a large-sized product finished with a sprayed coating, such as an automotive body, to form a protective film on the surface of the coating comprises steps of applying the strippable paint to the product, preliminarily or partially drying the product to which the paint has been applied, and then non-preliminarily or finally drying the product. In this way, the protective film is formed on the surface of the sprayed coating of the product. The temperature at which the non-preliminary drying is effected is preferably 60 to 90° C.

In the second embodiment of the invention, it is assured that a uniform protective film is formed on the surface of a large-sized product finished with a sprayed coating, such as an automotive body, by applying and drying the strippable paint.

In a third embodiment of the invention, a paint application apparatus for forming the protective film of the strippable paint in the second embodiment described above is provided to carry out the method for applying the paint. The apparatus comprises a booth for applying the paint to the sprayed product, a preliminary or partially drying furnace for preliminarily drying the strippable paint applied to the sprayed product, and a non-preliminarily or finally drying furnace for non-preliminarily drying the preliminarily or partially dried product. The preliminary drying furnace uses an infrared drying furnace. A hot air drying furnace is employed as the non-preliminary drying furnace.

In a fourth embodiment of the invention, a method for spraying a strippable paint on a large-sized product finished with a sprayed coating, such as an automobile, and equipped with holes for ejecting liquid near the center of the outer sprayed coating surface of the body and for with parts in which the airtightness is enhanced by sealing members such as rubber seals, consists of masking a range considerably wider than the applied region containing the ejecting holes and/or the part with enhanced airtightness, spraying the strippable paint on the product, removing the masking materials, and amending the paint around the holes and/or the part with enhanced airtightness. In this way, a protective film is formed by spraying the strippable paint.

In the fourth embodiment of the invention, the strippable paint for protecting the sprayed coating on a large-sized product such as an automotive body is applied to the product to form a protective film. At this time, the paint is not sprayed on those components to which the strippable paint is not required to be applied, such as sealing members for windshield washer nozzles, the sealing member for the opening in the sliding roof, and components such as side lights. As a result, a cumbersome operation of removing the protective film, which would normally be needed in conventional methods because the strippable paint and its dust erroneously adheres to the above-described components, is made unnecessary.

The present invention also provides a method and apparatus for forming a protective film on the surface of the sprayed coating of a large-sized product such as an automotive body by applying a strippable paint, based on a combination of the methods of the aforementioned first and second embodiments. The combination method consists of performing a pretreatment step for removing contaminations from the surface of the coating prior to formation of the protective film on the product, then applying the strippable paint to the pretreated product, preliminarily or partially drying the product to which the paint has been applied, and non-preliminarily or finally drying the preliminarily dried product, thus forming the protective film on the surface of the sprayed product.

The invention also includes an automobile assembly method including a strippable paint coating step, the assembly method comprising a pressing step of forming panel parts by plastic working thin sheet steel, a welding step of forming an automobile body by welding the panel parts together, a painting step of painting the surface of this automobile body, a subsequent assembly step of mounting an engine and functional parts and the like on the body, anti-scratch cover fitting and removal steps disposed before and after the assembly step, a strippable paint coating step of coating the painted surface of the finished automobile assembled in the assembly step with a strippable paint, and a final inspection step.

By interposing a strippable paint coating step between the above-mentioned painting and assembly steps so that the engine and functional parts and the like are assembled after a protective film is formed, the above-mentioned anti-scratch cover fitting and removal steps can be made unnecessary.

With this kind of method, compared to a case where strippable paint coating is carried out after the automobile is finished as has been the norm, the adhesion of dust and the like occurring in the assembly step, or in the assembly step and the inspection step, can be prevented, and the amount of equipment required and the number of manufacturing steps involved can be reduced and cost reductions achieved.

Other objects and features of the invention will appear in the course of the description thereof, which follows.

DETAILED DESCRIPTION OF THE PREFERRED EMBODIMENTS

Figure 1:
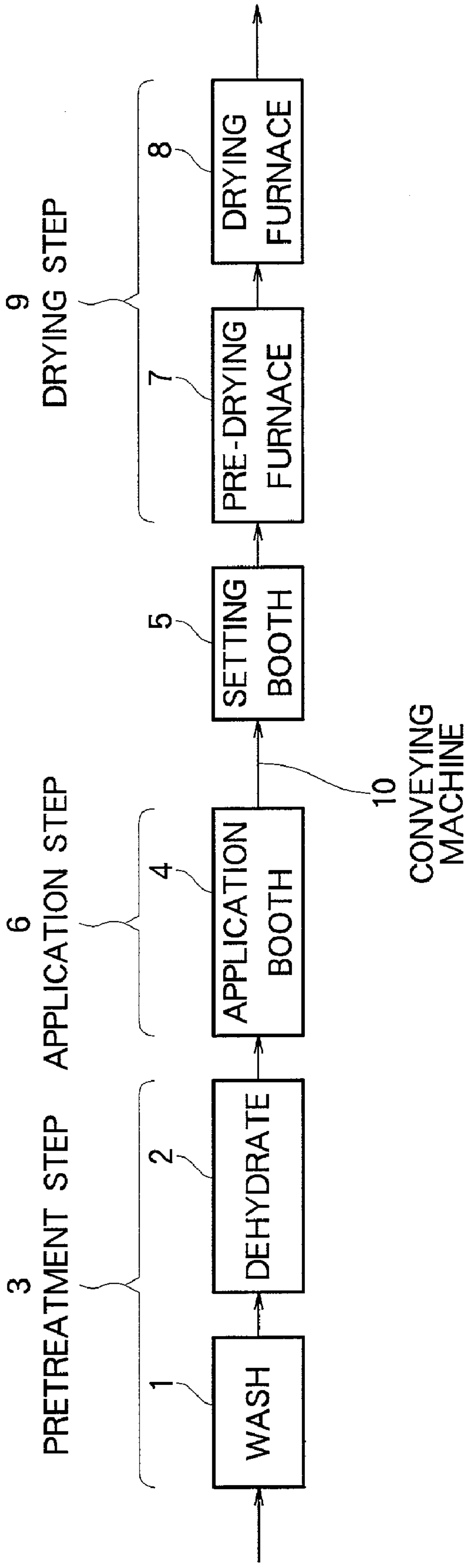
FIG. 1 is a block diagram of illustrating successive steps of a method of forming a protective film on the surface of a large-sized product finished with a sprayed coating by applying a strippable paint according to the present invention, the successive steps containing a pretreatment step consisting of a washing step using warm water and a dehydrating step using hot air, an application step consisting of applying the strippable paint for forming the protective film and a subsequent drying step consisting of multiple drying stages.

The preferred embodiments of the present invention are hereinafter described in detail by referring to the accompanying drawings. FIG. 1 illustrates successive steps for carrying out application of a strippable paint to form a protective film on a large-sized product finished with a sprayed coating, according to a preferred embodiment of the invention. The successive steps contain a step (pretreatment) carried out prior to application of the strippable paint and the subsequent steps of applying the strippable paint and drying the strippable paint.

In the illustrated example, the product having the sprayed coating to which the strippable paint is applied so as to form the protective film is an automobile. The body of this automobile is finished with a sprayed coating. Various appliances and components are incorporated in the body, thus producing a finished automobile. Then, the automobile is kept in stock and shipped. Emphasis is placed on the coating of the automobile for the sake of appearance, and the automobile is a large-sized product.

Before the automobile is shipped in this way, a strippable paint is applied to the surface of the coating of the body to form a protective film.

The successive steps are next described by referring to FIG. 1. The first preferred embodiment of the invention is described now. The automobile once manufactured is kept in stock and will be shipped. Contaminations such as dust, dirty water, and water such as rainwater adhere to the surface of the sprayed coating of the automobile. To form the protective film on this surface of the coating, the strippable paint is applied to the surface. Before the application of this paint, a pretreatment step is carried out. That is, it is necessary to remove contaminations such as dust, dirty water, and water such as rainwater from the surface of the coating. Hence, the pretreatment step 3 is conducted before the strippable paint is applied to form the protective film for the coating of the automobile.

In the pretreatment step 3, the sprayed coating surface is cleaned with clean water to remove contaminations such as dust, dirty water, and rainwater. This is designated washing step 1. In this washing step, a shower washer is used to prevent the surface of the coating from being scratched. In the washing step, room-temperature water normally is used. However, in cold-weather conditions, warm water is preferably used.

The automobile which has undergone the washing step 1 described above is transported by an appropriate conveying machine 10 such as a conventional hand truck or conveyor to the next station where a dehydrating step 2 is carried out. In the washing step 1, the surface of the sprayed coating of the automobile is wetted with water, which is required to be removed. In the dehydrating step 2, air is blown against the wetted surface of the coating of the automobile to remove the moisture from the surface of the body. In cold seasons, hot air is preferably used as the blown air, for the following reason. Where warm water is employed in the previous washing step 1, the air blowing step is effected, using hot air, in conformity with the warm water to maintain the surface of the coating of the automobile when sent to the next step at an appropriate temperature. The optimum temperature of the surface of the coating having undergone the washing step 1 and the dehydrating step 2 is 10 to 25° C.

In the case of an automobile having a displacement of the order of 2000 cc, if the temperature of the ambient surrounding the surface of the coating is −5° C., and if warm water of 40° C. is sprayed against the surface of the coating at a rate of 1.5/1 min, then a surface temperature of 18° C.±2° C. is obtained in 15 seconds.

In the pretreatment step 3 consisting of the washing step 1 and the dehydrating step 2 described thus far, when the automobile is kept in stock before being shipped, contaminations adhering to the surface of the coating of the automobile such as dust, dirty water, and rainwater are washed away. As a result, before the strippable paint is applied to form the protective film, the applied surface is cleaned with certainty. Therefore, the paint can be appropriately, reliably, and smoothly applied, and the protective film is effectively formed on the surface of the coating.

The second preferred embodiment of the invention, which is a method of forming a protective film on the surface of the sprayed coating of a product, is next described. The automobile which has undergone the pretreatment step 3 described above has its coating surface cleaned. The automobile is then conveyed by the conveying machine 10 to the next station where an application step is carried out to apply the strippable paint for forming the protective film. The application step, indicated by 6, is conducted inside an application booth 4 which is similar in structure to a paint application booth normally used. However, because a water-soluble strippable paint is preferably used, it is necessary to give considerations to the temperature and moisture inside the booth.

Where a water-soluble strippable paint is used, it is desired that the temperature and the moisture inside the boot be in ranges of 10–25° C. and 50–80%, respectively. As an example, Lapguard prepared by Kansai Paint Co., Ltd., Japan, was used as the water-soluble strippable paint, and it was applied inside the application booth 4 under the above-described temperature and moisture conditions.

Where the above-described water-soluble strippable paint is used, the protective film might not be appropriately formed from the paint if the temperature and the moisture are outside the above-described ranges. Any desired means can be employed to apply the strippable paint. For example, a brush, a roller, or a spray gun may be used.

After the strippable paint has been applied inside the application booth 4 in this way, the automobile is conveyed to a next station where a drying step, indicated by 9, is carried out. Prior to this conveyance, the automobile is moved into a setting booth 5. In the present example, the automobile is passed through the setting booth 5 between the application step 6 and the drying step 9. Normally, the temperature of the ambient inside the setting booth 5 is 15 to 30° C., and the humidity is 50 to 80%. In this setting booth 5, the automobile is allowed to stand for a long time after the application of the strippable paint before the drying step to cause the formed film to stabilize. The subsequent drying step 9 consists of preliminary or partially drying and non-preliminary or finally drying.

After the automobile to which the strippable paint has been applied has been moved out of the setting booth 5, the automobile is conveyed into a preliminary drying booth 7 to perform a preliminary drying.

An infrared drying furnace is used as a heat source in the preliminary drying furnace 7 to promote the partial drying of the protective film from the inside thereof, the protective film being formed on the surface of the coating. Preferably, the water-soluble strippable paint is illuminated with infrared radiation having wavelengths of 2 to 4 μm for 30 to 60 seconds. If the drying process is initiated from the outer surface of the protective film, holes or cracks will be formed in the surface of the protective film because of solvent or water emerging from inside thereof, thus deteriorating the performance of the protective film. Hence, the drying is preferably accelerated from inside the protective film according to the invention using an infrared drying furnace.

After the automobile is preliminarily dried in the preliminary drying furnace 7 as described above, the automobile is conveyed by the conveying machine 10 into a rear-stage, non-preliminary drying furnace 8 where the automobile is dried in a non-preliminary manner. A hot air drying furnace is preferably used as the non-preliminary drying furnace 8 because it is possible to uniformly heat the object to which the paint should be applied. With respect to the temperature conditions under which the hot air drying process is carried out, the automobile to which the present invention is applied is a finished automobile incorporating various electrical appliances and other accessories that are vulnerable to heat. Therefore, in order to protect these appliances and accessories, the drying temperature is preferably in the range from 60 to 90° C. If a drying process is carried out within this range, the electrical appliances and accessories can be prevented from being deteriorated in quality and characteristic.

The layout of the application booth used for the application step and the drying step for applying the strippable paint and forming the protective film, and the preliminary and non preliminary drying furnaces used for the drying step, form the third embodiment of the invention.

Where the protective film is formed by the application of the strippable paint as described above, the application and drying of the paint can be continuously, appropriately, reliably, smoothly, and efficiently conducted. Furthermore, the protective film can be formed uniformly according to the invention. Particularly, when the water-soluble strippable paint is dried, the preliminary drying furnace for effecting the preliminary drying step is effected by irradiation of infrared radiation. In consequence, a uniform protective film having desired thickness and having neither holes nor cracks can be obtained.

Figure 6:
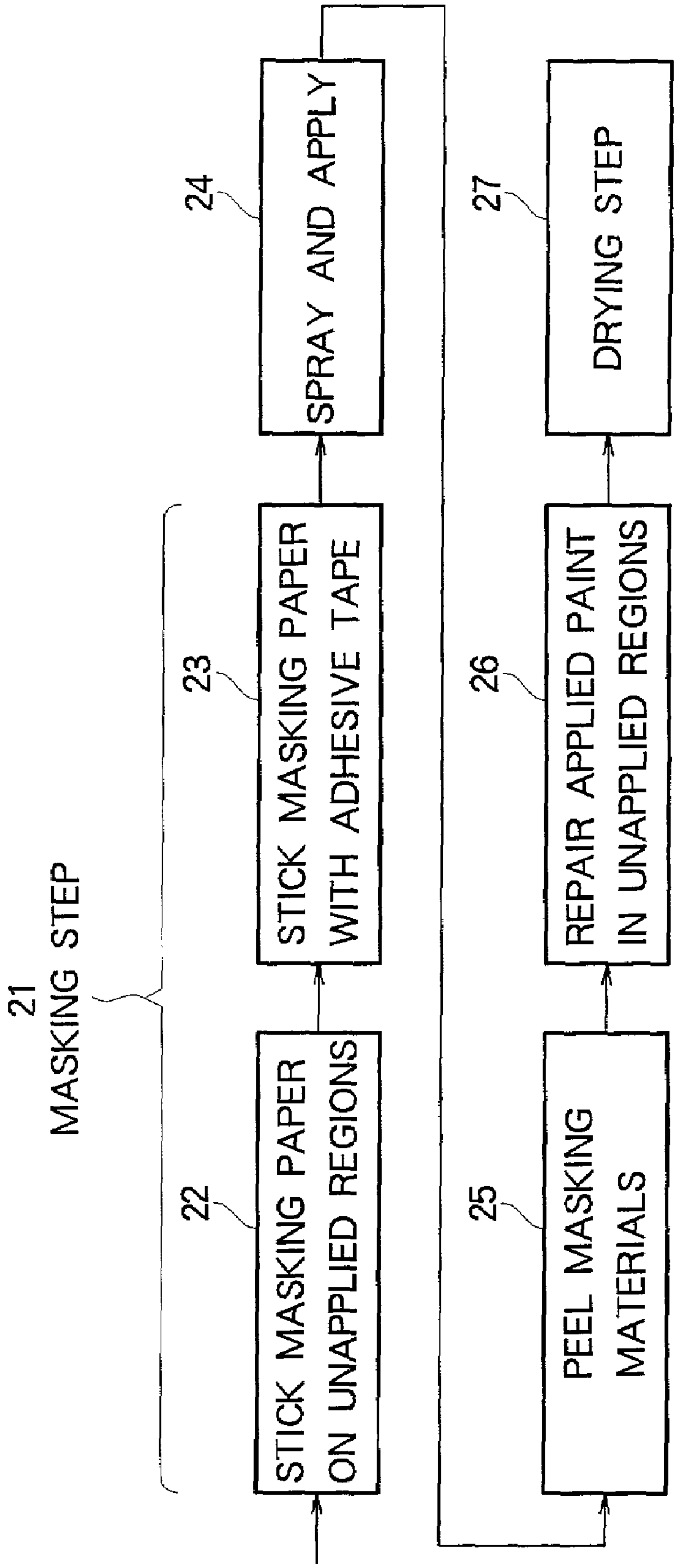
FIG. 6 is a block diagram illustrating successive steps of a method of forming a protective film where the sprayed coating surface contains regions on which the protective film is not required to be formed, such as illustrated in FIGS. 2–5.

The fourth embodiment of the present invention is now described by referring to FIGS. 2–6. FIG. 6 is a block diagram illustrating the successive steps of this embodiment.

Figure 2:
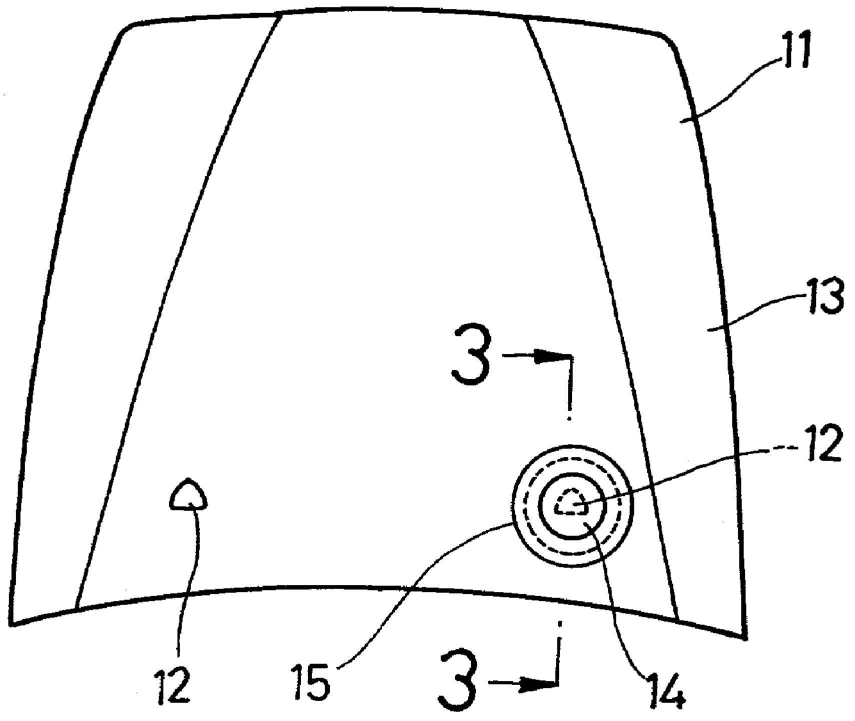
FIG. 2 is a plan view illustrating a method consisting of masking windshield washer nozzles and spraying a strippable paint according to the invention.
Figure 3:
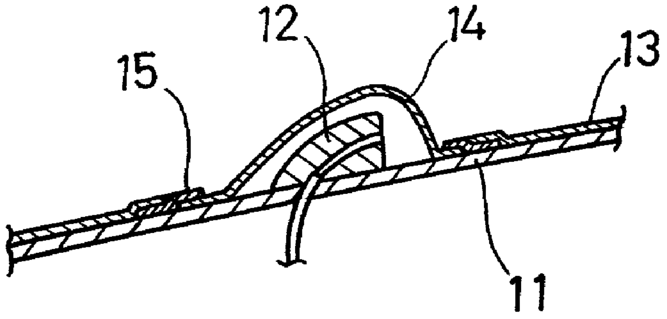
FIG. 3 is an enlarged cross section taken on line 3—3 of FIG. 2.

Shown in FIG. 2 is a hood 11 forming an example of an outer sprayed coating surface of an automobile. Two windshield washer nozzles 12 are formed on opposite sides of the center of the hood 11 to spray cleaning liquid against the windshield, for cleaning it.

Where a protective film is formed by spraying a strippable paint 13 on the hood 11, the following steps are carried out. First, a masking step 21 is conducted. That is, masking paper 14 is stuck on a region, i.e., the hood surface, which is somewhat wider than each washer nozzle 12 existing inside the region to which the strippable paint 13 is to be applied. Thus, the nozzle is covered. In FIG. 2, the masking paper 14 is shown to be stuck on the region around the right one of the washer nozzles 12 using pressure sensitive adhesive tape is; the left one is shown as it is to show one nozzle clearly. Then, a spraying-and-applying step 24 is effected, i.e., the strippable paint 13 is sprayed to apply the paint 13 to the coating surface of the hood 11. Thereafter, the masking paper 14 and pressure-sensitive adhesive tape 15 are removed. This is referred to as the peeling step 25. Finally, a repairing application step 26 is carried out. That is, the strippable paint 13 is applied to the surroundings of the washer nozzle 12 so as to repair the film. Subsequently, the repaired portion is subjected to a drying step 27.

In the masking step 21, a step 22 consisting of covering the washer nozzle 12 with a circular piece of masking paper 14, as illustrated in FIG. 2, is first performed. Then, the annular pressure-sensitive adhesive tape 15 is stuck on the coating surface of the hood 11 around the masking paper 14 (step 23). Conventional masking paper and pressure-sensitive adhesive tape may be employed as the masking paper 14 and the pressure-sensitive adhesive tape 15, respectively. A commercially available masking roll paper can be used as the masking paper 14. A pressure-sensitive adhesive tape manufactured by Nichiban Co., Ltd, Japan, is used as the adhesive tape 15.

In the next spraying-and-applying step 24, the strippable paint 13 is sprayed against the whole hood 11 including the masking paper 14 and the pressure-sensitive adhesive tape 15. The paint 13 is so sprayed that a desired protective film is formed on the surface of the hood 11 which is a coating surface. The method of spraying the paint may be either air spray or airless spray. The method may be selected according to the viscosity of the strippable paint 13.

In the peeling step 25, the masking paper 14 and the pressure-sensitive adhesive tape 15 on and around the washer nozzle 12 are peeled off.

Then, the repairing application step 26 is performed. In particular, after peeling off the masking paper 14 and the pressure-sensitive adhesive tape 15, the strippable paint 13 is applied to the unapplied region appearing around the nozzle 12, using a brush.

After completing these steps, the drying step 27 is carried out by air drying or forced drying to form a protective film around the masked portion.

Figure 4:
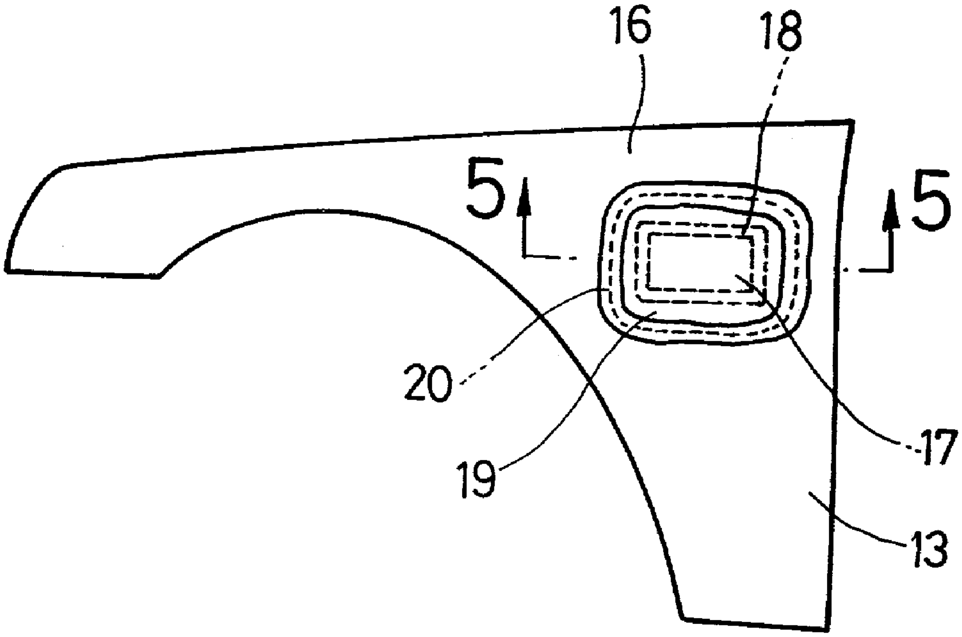
FIG. 4 is a side elevation illustrating a method consisting of masking turning lights mounted at front fenders and spraying a strippable paint according to the invention.
Figure 5:
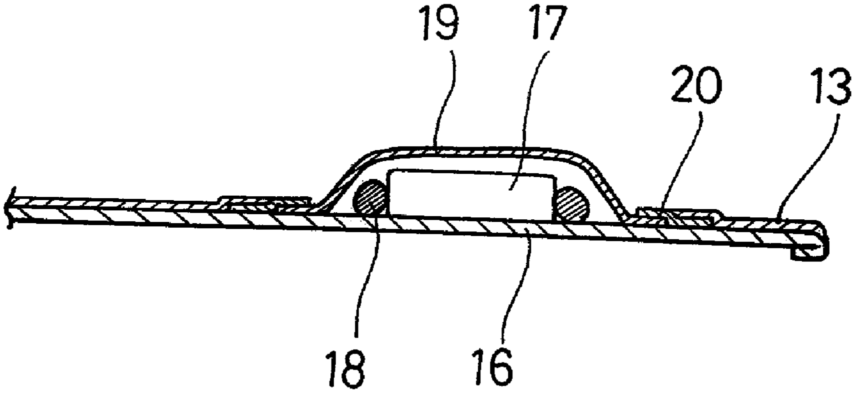
FIG. 5 is an enlarged cross section taken on line 5—5 of FIG. 4.

As shown in FIG. 4, a side turning light 17 for indicating the direction of movement of the automobile is mounted on the front fender 16 together with rubber seal 18, the fender 16 forming an outer sprayed coating surface of the automobile.

Where the strippable paint 13 is sprayed on the front fender 16, a protective film is formed in the same way as in the above-described process. That is, the paint is applied by carrying out the masking step 21 for masking the unapplied region, the spraying-and-applying step 24, the masking peeling step 25, the repairing application step 26, and the drying step 27.

Also in this example, the strippable paint 13 is sprayed after desired portions are masked in the same way as in the case of the hood. More specifically, masking paper 19 is stuck on a region that is somewhat wider than the side turning light 17 located inside the region to which the paint 13 is to be applied so as to cover the turning light 17. The fringes of the masking paper 19 are fixed with pressure-sensitive adhesive tape 20. Then, the strippable paint 13 is sprayed on the coating surface of the fender 16 including the masking paper 19 and the tape 20. In this way, the paint 13 is applied to the coating surface of the front fender 16. Thereafter, the masking paper 19 and the peripheral adhesive 20 are peeled from the coating surface. The paint 13 is then applied with a brush to the unapplied region located around the side turning light 17. Natural drying or forced drying is selected and carried out in the same way as the foregoing embodiment. A protective film is formed on this portion.

In the present example, the strippable paint is not applied to those portions which are not required to be coated with the protective film of the strippable paint. This makes it unnecessary to perform a cumbersome and complex strippable paint-removing procedure at the destination. Furthermore, when the masking step is carried out, a region somewhat wider than the masked object is masked and, therefore, no parting step is necessary. As a result, the masking work is facilitated.

On automobile assembly lines, rustproofing wax or strippable paint is coated onto the painted surfaces of automobiles after they have been assembled and passed through a finished vehicle inspection step in order to prevent scratching of the painted surfaces of the automobile bodies and the adhesion of dust and the like thereto. The strippable paint is coated onto the painted surfaces as described above.

Conventionally, as mentioned above, because coating of the strippable paint is often carried out in a separate step after the finished vehicle inspection step, there have been the following kinds of problems.

In order to prevent the adhesion of dust and dirt to the automobile body and to prevent scratching thereof in the assembly steps after painting of the automobile body, an anti-scratching cover relative to the vehicle body is necessary, and steps of fitting and removing this anti-scratching cover are necessary. As a result, equipment and manufacturing steps for both scratch-prevention and strippable paint coating are required. Consequently, because a lot of equipment and numerous manufacturing steps are required and the equipment and manufacturing steps are discontinuous, an independent, separate coating equipment space is necessary in the conventional methods so that this method is disadvantageous from the space-efficiency viewpoint. Also, strippable paint coating equipment and a coating step completely separate from the steps and equipment which were continuous up to the finished vehicle inspection step are necessary and in some cases a double investment in equipment and manufacturing steps is involved, and consequently the method is disadvantageous from the economic viewpoint also. Furthermore, individual and overall cost increases and increases in man-hours result, and the method is therefore also disadvantageous from the cost reduction and man-hour reduction viewpoints.

Therefore, a strippable paint coating step by which the above-mentioned strippable paint coating can be carried out efficiently in terms of equipment and space and with which scratching of the painted surfaces of the product and the adhesion of dust thereto can be suitably and effectively prevented is called for.

According to the present invention a production line satisfying this need can be provided, and preferred embodiments of the invention with which these kinds of problem also can be solved will now be described in detail.

Figure 7:
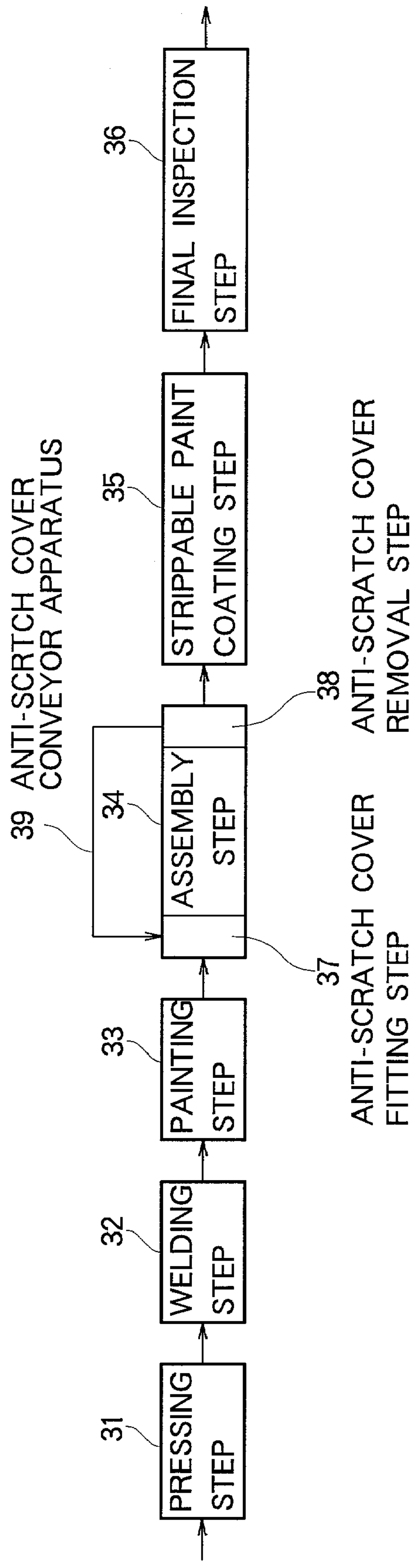
FIG. 7 is a block diagram of an automobile assembly process including a strippable paint coating step.
Figure 8:
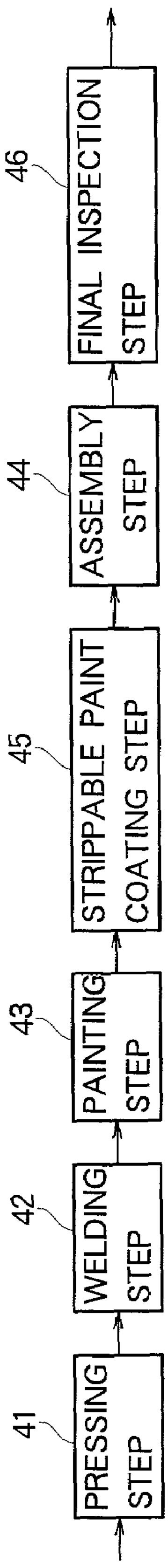
FIG. 8 is a block diagram of another preferred embodiment of an automobile assembly process including a strippable paint coating step.

FIG. 7 and FIG. 8 show in order the manufacturing steps of two such preferred embodiments, respectively.

FIG. 7 is a block diagram showing a first preferred embodiment of an automobile assembly process including a strippable paint coating step. In this preferred embodiment, first, in a pressing step 31, panel parts are formed by plastically working thin sheet steel. The pressed panel parts are then provisionally assembled using jigs or the like and transferred by a conveyor not shown in the drawings to a welding step 32. In the welding step 32 the panel parts are welded together by spot welding or the like to form an automobile body. The surface of this automobile body is painted in a painting step 33 involving a conversion treatment carried out on the automobile body, after which paint is then coated onto the body surface and the painting step 33 thereby completed. Although not shown in the drawings, after painting the automobile ordinarily goes through a drying step and the paint is thereby dried to complete the painting step 33.

After going through the above-mentioned painting step the automobile body is conveyed to an assembly step 34 and an engine and functional parts are fitted thereto. An anti-scratch cover fitting step 37 and an anti-scratch cover removal step 38 are provided before and after the assembly step 34. An anti-scratch cover conveyor apparatus 39 links these steps 37 and 38, and this anti-scratch cover conveyor apparatus 39 conveys covers removed in the anti-scratch cover removal step 38 and returns them to the anti-scratch cover fitting step 37 for reuse.

Finished automobiles assembled in the assembly step 34 are conveyed as they are to the next step which is a strippable paint coating step 35. In this strippable paint coating step 35 a strippable paint which forms a protective film on the painted body surface is coated onto the surface and goes through a drying step as above and a protective film is thereby formed on the body surface. In this way a painted, finished automobile with its painted surfaces protected by a protective film is obtained. This is followed by a finished vehicle inspection step 36 wherein the conformity to specifications of the finished automobile assembled and coated with strippable paint are checked.

According to the above embodiment, because strippable paint coating is carried out immediately after the assembly step is completed, scratching and adhesion of dust and the like occurring between the assembly step and the completed vehicle inspection step can be prevented.

FIG. 8 is a block diagram showing in order the steps of a second preferred embodiment of an automobile assembly process including a strippable paint coating step. This second preferred embodiment of an automobile assembly process including a strippable paint coating step will now be described with reference to FIG. 8. Basically, most of the steps are common with those of the first preferred embodiment of FIG. 7.

In the automobile assembly process shown in FIG. 8, first, in a pressing step 41, panel parts are formed by plastically working thin sheet steel. The pressed panel parts are then provisionally assembled using jigs or the like and transferred by a conveyor not shown in the drawings to a welding step 42. In the welding step 42 the panel parts are welded together by spot welding or the like to form an automobile body. The surface of this automobile body is painted in a painting step 43 involving a conversion treatment after which paint is then coated onto the body surface and the painting step 43 thereby completed. Although not shown in the drawings, after being painted the automobile ordinarily goes through a drying step and the paint is thereby dried to complete the painting step 43.

After the above-mentioned painting step 43 and before the assembly step 44, a strippable paint coating step 45 is interposed. In the strippable paint coating step 45, strippable paint is coated onto the painted surface of the automobile body having passed through the painting step 43. After the strippable paint is coated, it is dried by going through for example infrared drying and/or hot-air drying as above, and a protective film is formed on the painted surface.

After that, as above, the automobile body is conveyed to an assembly step 44 and an engine and functional parts are mounted thereon. In this preferred embodiment, because the strippable paint coating step 45 is interposed after the painting step 43 and before the assembly step 44, the kind of anti-scratch cover fitting and removal steps provided before and after the assembly step in the preferred embodiment of FIG. 7 are unnecessary. Of course, the strippable paint is applied in a suitable amount to form a protective film of sufficient thickness to protect the paint finished surfaces of the vehicle from scratches, adhesion of dust and the like during the assembly step 44.

Completed automobiles assembled in the assembly step 44 are conveyed as they are to the next and final step, the finished vehicle inspection step, and finished vehicle inspections are carried out.

According to this preferred embodiment, together with the effect that it is possible to prevent scratching and the adhesion of dust from occurring between the above-mentioned assembly step and the finished vehicle inspection step, as mentioned above the anti-scratch cover fitting and removal steps provided before and after the assembly step become unnecessary. It is notable in this connection that in the work of assembling the engine and functional parts to the body in the assembly step 44, dust and the like are unavoidable. However, as a result of the automobile bodies going through the strippable paint coating step 45 a strong protective film is formed on the painted surface by the strippable paint coating. Consequently, even if dust or the like occurring in the assembly step alights on the painted surface it is prevented from affecting the painted surface and even if in the assembly step dirt alights on the painted surface of the body it can easily be removed by a subsequent simple wiping-off. With this preferred embodiment, as described above, because anti-scratch cover fitting and removal steps are unnecessary, cost and labor reductions can be achieved. Although there have been described what are at present considered to be the preferred embodiments of the invention, it will be understood that various modifications and variations may be made thereto without departing from the spirit and essence of the invention. The scope of the invention is indicated by the appended claims.

What is claimed is:

1. In a method of manufacturing a product involving press forming panel parts from a sheet metal, welding the parts together to form a product body and finishing a surface of the body with a sprayed coating, said method comprising the steps of:

applying a strippable paint to the surface of the sprayed coating of the product;

partially drying said strippable paint applied to the surface of the sprayed coating of the product so as to promote drying of the strippable paint from inside thereof; and finally drying the product to uniformly dry the entire strippable paint applied to the surface of the sprayed coating of the product, wherein said applying, partially drying and finally drying steps are carried out while the product is being manufactured.

2. The method of claim 1, wherein said step of partially drying said product uses infrared radiation.

3. The method of claim 2, wherein said step of finally drying said strippable paint uses hot air drying.

4. The method of claim 2, wherein said strippable paint is a water-soluble sirippable paint and wherein said step of partially drying said a water-soluble strippable paint is carried out by irradiating the applied paint with infrared radiation having a wavelength of about 2 to 4 μm for about 30 to 60 seconds.

5. The method of claim 1, wherein said step of finally drying said product is carried out at a temperature of 60 to 90° C.

6. The method of claim 1, wherein said strippable paint is a water-soluble strippable paint, and said strippable paint is applied within a space isolated from surroundings at a temperature of about 10–25° C. at a humidity of about 50–90%.

7. The method of claim 1, wherein said finally drying step is performed at above ambient temperature.

8. The method of claim 1, further comprising a step of treating said strippable paint after it is applied to said product to stabilize same, prior to said partially drying step.

9. The method of claim 1, wherein said strippable paint is a water-soluable strippable paint, the step of partially drying said strippable paint is carried out by irradiating the applied strippable paint with infrared radiation having a wave length of 2 to 4 μm for about 30 to 60 seconds, and the step of finally drying the product uses hot air.

10. The method of claim 9, wherein the step of finally drying the product is carried out at a temperature of 60 to 90° C.

11. The method of claim 1, wherein said strippable paint is a water-soluable soluble strippable paint, the water-soluble strippable paint is applied within a space isolated from surroundings at a temperature of about 10–25° C. and a humidity of about 50–90%, the step of partially drying said strippable paint is carried out by irradiating the applied strippable paint with infrared radiation having a wave length of 2 to 4 μm for about 30 to 60 seconds, and the step of finally drying the product uses hot air.

12. The method of claim 11, wherein the step of finally drying the product is carried out at a temperature of 60 to 90° C.

13. The method of claim 1, wherein said product is an automobile, and the method further involves an assembling step of mounting an engine and functional parts to the automobile body after said applying, partially drying and finally drying steps.

14. The method of claim 13, further including the steps of: inspecting the automobile after it is manufactured and shipping the manufactured vehicle after the inspecting step, wherein said inspecting and shipping steps are carried out while the strippable paint remains coated on the automobile body.

15. The method of claim 13, wherein said protective film formed in said strippable paint coating step has a sufficient thickness to protect said sprayed coating finished surface of the automobile body against scratches during said assembling step.

16. A method of forming a protective film from strippable paint on an outer surface of a product finished with a sprayed coating, the surface being provided with discontinuities on which the protective film is not to be formed, said method comprising the steps of:

masking a region with a masking material on said sprayed coating, said masked region being wider than an unapplied region on which the protective film is not to be formed;

spraying strippable paint against said coating surface of said product including the masked region to form a film;

peeling said masking material from said unapplied region containing the discontinuities; and applying said strippable paint to portions of the unapplied regions remaining around said discontinuities so as to repair said film of said strippable paint.

17. The method according to claim 16, wherein the product is an automobile and said strippable paint is applied using a brush or a roller in said step of applying said strippable paint to the portions of the uuapplied regions remaining around said discontinuities.

18. The method of claim 16, wherein said product is an automobile, and said masking material includes at least one of paper and tape.

19. A method of forming a protective film on a surface of an automobile finished with a sprayed coating by applying a strippable paint to a surface of said sprayed coating after manufacture of the automobile and before shipment of the automobile, said method comprising the steps of:

removing contaminations from the surface of said sprayed coating of the automobile;

subsequently applying a strippable paint to the surface of the sprayed coating of the automobile;

partially drying said strippable paint applied to the surface of the sprayed coating of the automobile so as to promote drying of the strippable paint from inside thereof; and then finally drying the automobile to uniformly dry the entire strippable paint applied to the surface of the sprayed coating of the automobile.

20. The method of claim 19, wherein said contaminations removing step consists of a washing step for washing the surface of the sprayed coating of the automobile and a subsequent dehydrating step for removing moisture from the surface of the sprayed coating of the automobile.

21. The method of claim 20, wherein said washing step is carried out using warm water.

22. The method of claim 20, wherein said dehydrating step is carried out using blown air.

23. The method of claim 22, wherein said blown air is hot air.

24. The method of claim 20, wherein said washing step uses warm water and said dehydrating step uses hot air.

25. The method of claim 20, wherein said washing step is shower washing.

26. The method of claim 19, wherein the step of partially drying said strippable paint uses infrared radiation, and the step of finally drying the automobile uses hot air.

27. The method of claim 26, wherein the step of finally drying the automobile is carried out at a temperature of 60 to 90° C.

28. The method of claim 19, wherein said contaminations removing step being performed at an appropriate temperature so that a resulting temperature of the surface of the automobile is in a range of 10–25° C. even when an ambient temperature surrounding said automobile is not within said range.

29. The method of claim 19, wherein said strippable paint is a water-soluable strippable paint, the step of partially drying said strippable paint is carried out by irradiating the applied strippable paint with infrared radiation having a wave length of 2 to 4 μm for about 30 to 60 seconds, and the step of finally drying the automobile uses hot air.

30. The method of claim 29, wherein the step of finally drying the automobile is carried out at a temperature of 60 to 90° C.

31. The method of claim 19, wherein said strippable paint is a water-soluable strippable paint, the water-soluble strippable paint is applied within a space isolated from surroundings at a temperature of about 10–25° C. and a humidity of about 50–90%, the step of partially drying said strippable paint is carried out by irradiating the applied strippable paint with infrared radiation having a wave length of 2 to 4 μm for about 30 to 60 seconds, and the step of finally drying the automobile uses hot air.

32. The method of claim 31, wherein the step of finally drying the automobile is carried out at a temperature of 60 to 90° C.

33. The method of claim 19, further including a step of treating said strippable paint applied to the surface of the sprayed coating of the automobile to stabilize same, prior to said partially drying step.

* * * * *